March 5, 1957  J. H. MURPHY  2,783,858
HYDRAULIC BRAKE ASSEMBLY
Filed July 20, 1955  3 Sheets-Sheet 1

INVENTOR.
JOHN H. MURPHY.
BY
RICHEY, WATTS, EDGERTON & McNENNY,
ATTORNEYS

March 5, 1957 J. H. MURPHY 2,783,858
HYDRAULIC BRAKE ASSEMBLY
Filed July 20, 1955 3 Sheets-Sheet 2

INVENTOR.
JOHN H. MURPHY.
BY
RICHEY, WATTS, EDGERTON & McNENNY
A.H. Edgerton
ATTORNEYS

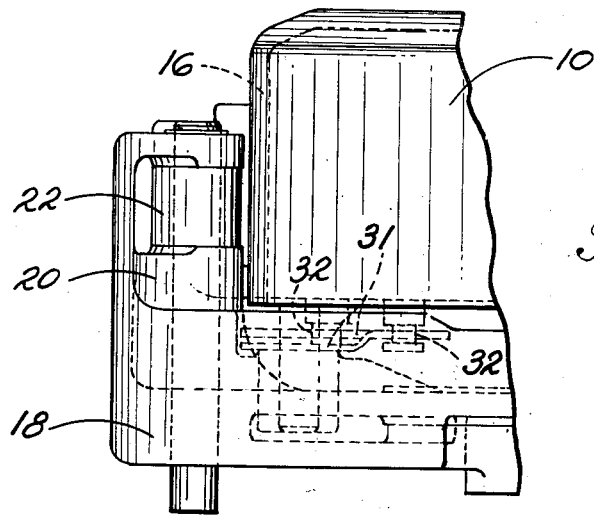
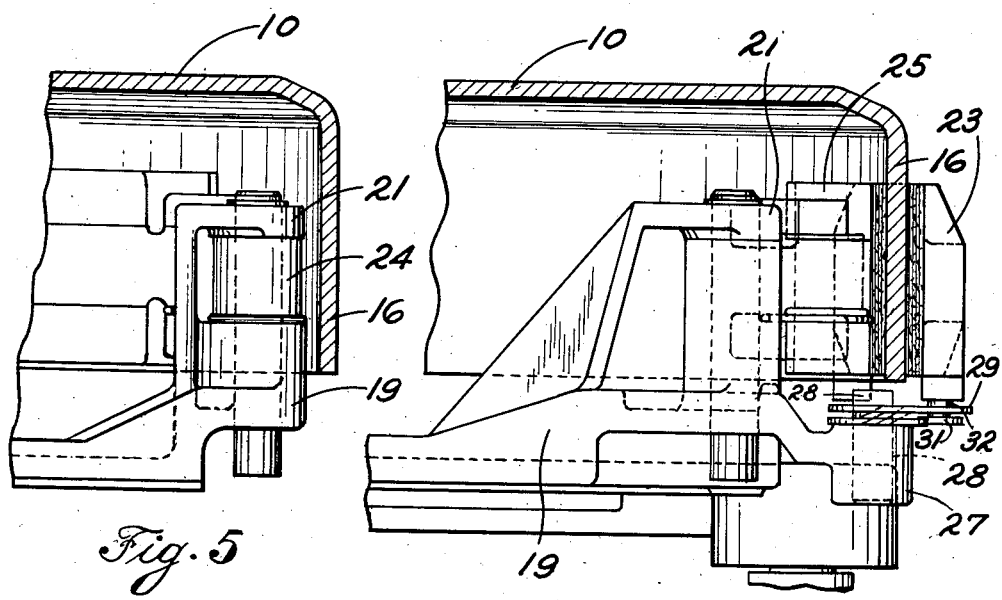

United States Patent Office 2,783,858
Patented Mar. 5, 1957

2,783,858

HYDRAULIC BRAKE ASSEMBLY

John H. Murphy, Detroit, Mich., assignor to Detroit Duo Grip Brake Corporation, Detroit, Mich., a corporation of Michigan Application July 20, 1955, Serial No. 523,281

5 Claims. (Cl. 188—76)

This invention relates broadly to vehicular brakes and more specifically to a fluid operated brake of the type that embodies a pivoted yoke disposed in straddled relation with the brake drum flange and engaged with the inner and outer brake shoes.

The invention pertains to improvements in a brake of the type disclosed in my Patent No. 2,700,437, entitled "Brake Actuating Mechanism," issued January 25, 1955.

One of the objects of the invention is to provide a hydraulic piston cylinder assembly in the brake shoe actuating yoke for the simultaneous actuation of the shoes.

Another object of the invention is to provide a journal bearing for the yoke supporting structure which will afford limited orbital movement thereof in order to facilitate self-alignment of the yoke with the shoes.

Further objects of the invention are to provide a brake assembly which is economic of manufacture, efficient of operation, durable and readily accessible for adjustment and repair.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 3 is a plan view of a fragmentary portion of the brake viewed, as shown, by the line 3—3 in Fig. 1;

Fig. 4 is a side elevational view of a fragmentary portion of the brake viewed, as indicated, by the line 4—4 in Fig. 1, a portion of the drawing being illustrated in section in the interest of clarity; and Fig. 5 is a plan view of a portion of the brake, viewed, as shown, by the line 5—5 in Fig. 1.

Figure 1:
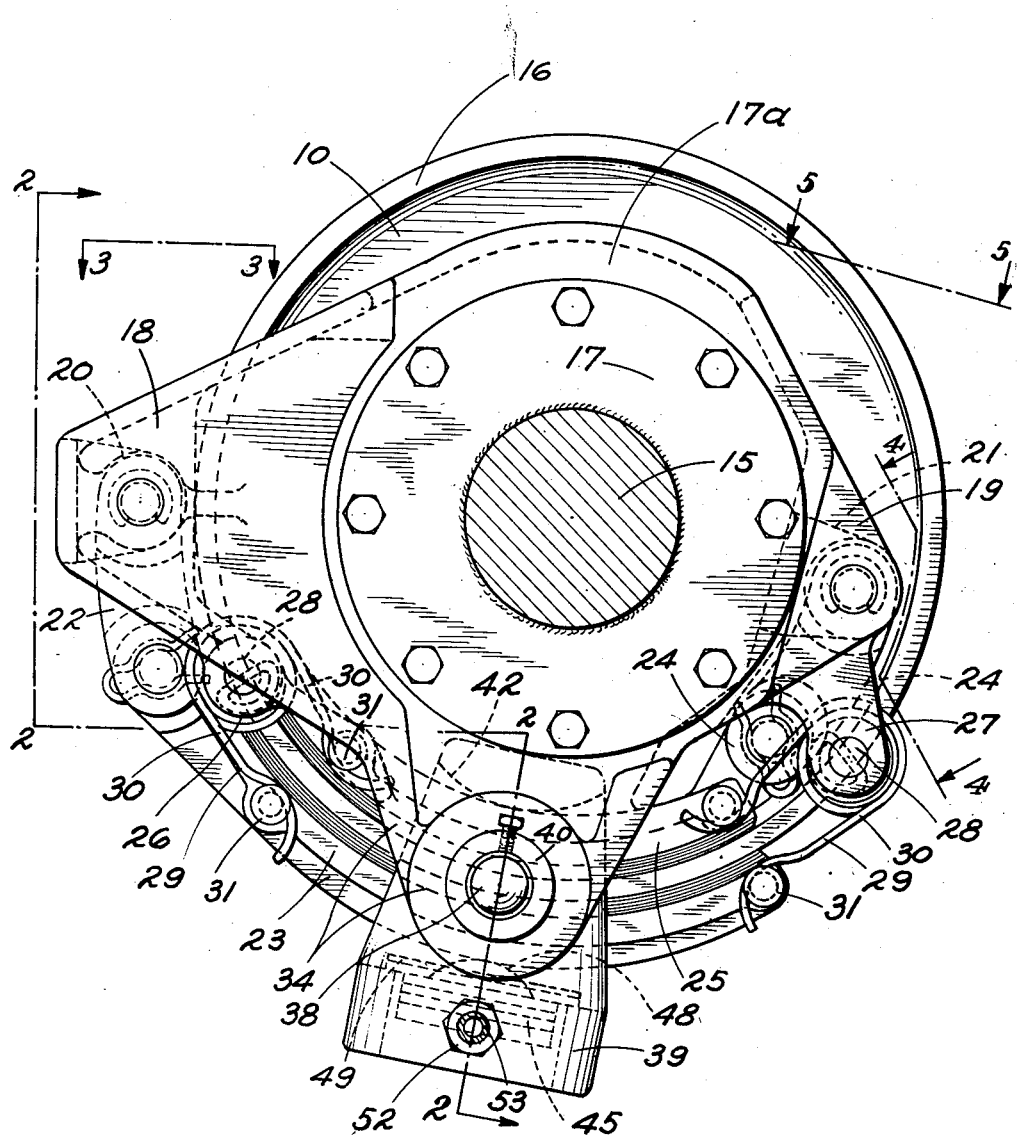
Fig. 1 is a side elevational view of the improved brake.
Figure 2:
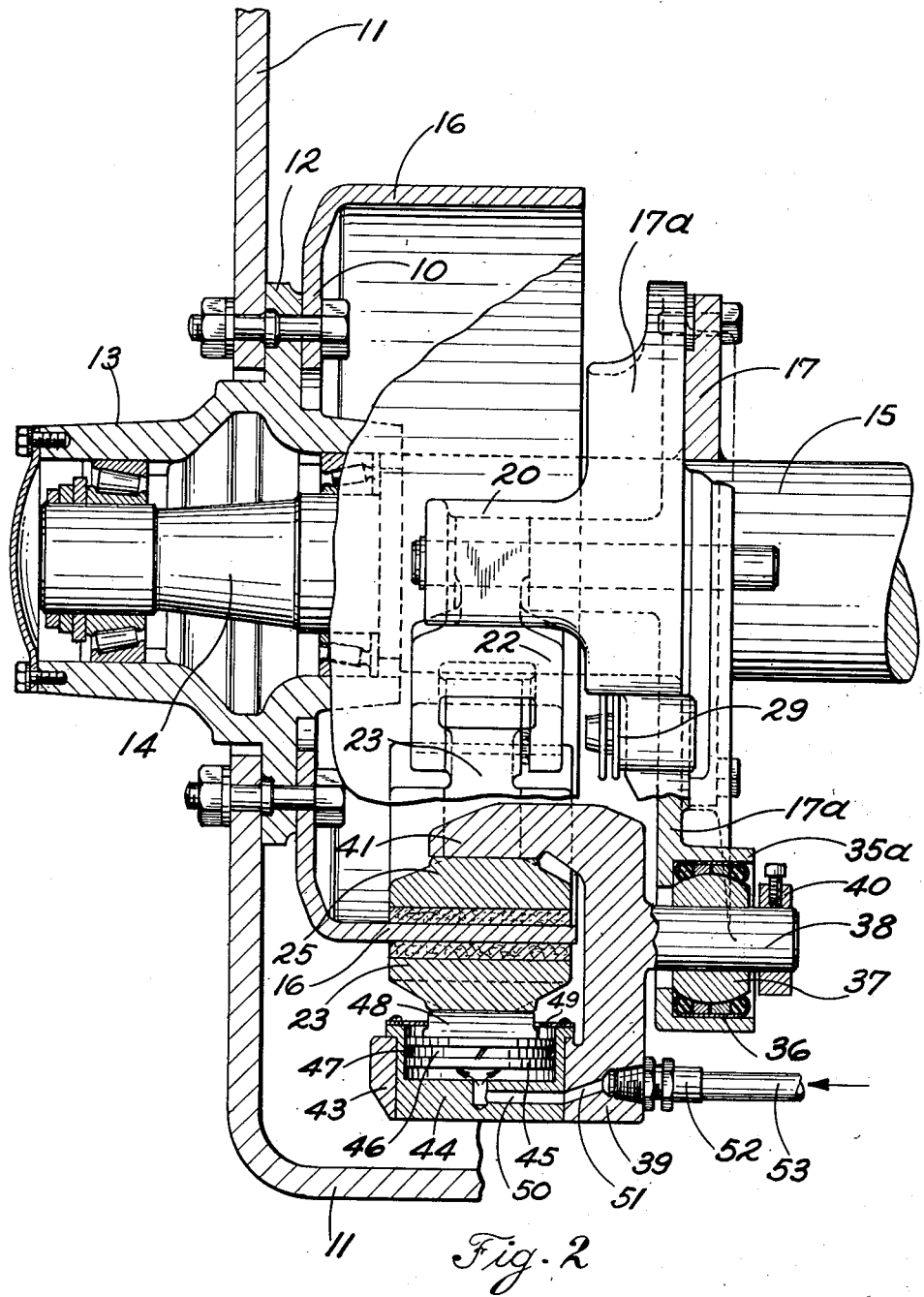
Fig. 2 is an elevational view partially in section, in the interest of clarity, the section being indicated generally by the line 2—2 in Fig. 1.

Referring first to Fig. 2, the brake drum 10 and vehicular wheel 11 are mounted on the flanged portion 12 of a hub 13 supported by antifriction bearings on the spindle 14 of a non-rotative automobile axle 15. The brake drum is formed with flange 16 mounted with the rim thereof in confronting relation with a bracket 17 affixed to the axle 15. The bracket, as will be seen in Fig. 1, is provided with diametrically opposed arms 18 and 19 having inturned bosses 20 and 21 on the free ends thereof. The boss 20 on the arm 18 protrudes beyond the circumferentive face of the drum 10, while the boss 21 on the arm 19 is disposed within the brake drum. The boss 20 supports a pendulous link 22 pivotally connected to the outer brake shoe 23. The boss 21 supports a link 24 pivotally connected to the inner brake shoe 25. The arms 18 and 19 are formed with depending ears 26 and 27 drilled to receive pintles 28 which are cross-milled to retain spiral springs 29 having lineal end portions or arms 30 engaged with pins 31 mounted in the inner and outer brake shoes 23 and 25. The springs are wound with right and left convolutions normally urging the lineal arms apart, and the ends of the spring arms are curved for seated engagement in grooves 32 (Figs. 3 and 4), in the pins 31.

The bracket 17 and the associated frame 17a, carrying the arms 18 and 19, is further provided with a depending lug 34 intermediate the arms 18 and 19 having a lateral boss 35a thereon which is bored and counterbored for the reception of a universal bearing 36 comprising a cage supporting non-metallic packing rings formed to facilitate the oscillatory movement of a spherical sleeve 37 affixed upon the shank 38 of a brake shoe actuating yoke 39. The yoke is restrained from axial movement by a collar 40 clamped upon the shank 38 thereof. The arms of the yoke span the inner and outer brake shoes, the upper arm 41 having a rounded anvil 42 thereon engaged with the inner face of the shoe 25. The lower arm 43 of the yoke 39 is bored to receive a cylinder 44 having a piston 45 therein which is grooved to receive a split ring 46 urging an O-ring 47 against the side wall of the cylinder. The top of the piston is formed with an arcuate anvil 48 engaged with the outer face of the outer brake shoe 23 (Fig. 1) and the upper end of the cylinder is flanged and provided with a disc or cap 49 having a central opening thereon to facilitate the reciprocative movement of the piston. The base of the cylinder is drilled to form a passage 50 communicating with the bore in the cylinder and a canal 51 in the lower portion of the web of the yoke 39. The canal 51 is provided with a pipe fitting 52 coupled with a flexible hose 53 leading to a source of pressure fluid and valve operating mechanism, not shown.

When the brake is applied, the pressure fluid in the hose 53 will enter the cylinder and force the piston upwardly into impinged relation with the brake shoe 23. As the shoe impinges the brake drum, the pivotal connection therefor will yield and cause the yoke to oscillate in its spherical journal bearing 36 and thus draw the anvil 42 into impinged relation with the inner brake shoe. Upon release of the pressure fluid in the cylinder 44, the springs 29 will effect the retraction of the shoes from the brake drum flange.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A brake comprising a flanged brake drum, a stationary bracket adjacent thereto, an outer brake shoe pivotally supported by said bracket, an inner brake shoe pivotally supported by said bracket, a yoke pivotally supported by said bracket intermediate the pivotal supports for said shoes, arms on said yoke spanning the brake drum flange and the inner and outer brake shoes, a cylinder in one of the arms of said yoke and a fluid operated piston therein engaged with the contiguous brake shoe.

2. A brake comprising a brake drum, a fixed bracket adjacent thereto, an outer brake shoe pivotally mounted on said bracket, an inner brake shoe pivotally mounted on said bracket in spaced circumferential relation to the pivotal connection for the outer brake shoe, springs engaged with the brake shoes urging them apart, a yoke pivotally supported on said bracket, arms on said yoke spanning the brake drum flange and said shoes, a cylinder in the lower arm of said yoke, and a fluid operated piston in said cylinder engaged with the outer brake shoe.

3. A brake comprising a flanged brake drum, a stationary bracket adjacent thereto, arms on said bracket disposed laterally on each side of the brake drum flange, a link pivoted on said one of said arms, an outer brake shoe pivoted to said link, a second link pivoted on another of said arms, an inner brake shoe pivoted to the last named link, springs supported on said arms arranged to force the brake shoes apart, a yoke mounted on said bracket for universal movement, arms on said yoke spaced to span the brake drum flange and the inner and outer brake shoes, a cylinder in the lower arm of said yoke and a fluid operated piston therein engaged with the outer brake shoe, whereby actuation of the piston will effect impingement of the outer brake shoe with the brake drum flange, and movement of the yoke will effect impingement of the upper arm thereof with the inner brake shoe.

4. A brake comprising a flanged brake drum, a stationary bracket adjacent thereto, an outer brake shoe pivotally supported by said bracket, an inner brake shoe pivotally supported by said bracket, a yoke supported by said bracket, arms on the yoke disposed in straddled relation with the inner and outer brake shoes, a shank on said yoke, a spherical journal thereon, a spherical bearing in said bracket supporting said spherical journal for universal movement, an arcuate anvil on the inner face of the upper arm of said yoke, a cylinder in the lower arm of the yoke, a piston therein, and a fluid coupling in said cylinder for conducting pressure fluid to the cylinder.

5. A brake, a flanged brake drum, a fixed bracket adjacent thereto, an outer brake shoe pivotally mounted on said bracket, an inner brake shoe pivotally mounted on said bracket, a yoke pivotally supported by said bracket, arms on said yoke straddling the brake shoes, a cylinder in one of the arms of said yoke and a fluid operated piston in said cylinder abutting its contiguous brake shoe, whereby said pivotally supported yoke will rock about its fulcrum upon actuation of said piston and draw both of said shoes into engagement with said brake drum.

References Cited in the file of this patent
UNITED STATES PATENTS

| | | |
|---|---|---|
| 2,265,578 | Rosenberg | Dec. 9, 1941 |
| 2,285,241 | Walther | June 2, 1942 |
| 2,563,392 | Butler | Aug. 7, 1951 |